(12) United States Patent
Futatsugi

(10) Patent No.: US 7,580,934 B2
(45) Date of Patent: Aug. 25, 2009

(54) INFORMATION PROCESSING METHOD AND APPARATUS FOR MANAGING ACCESS RIGHTS TO AN OBJECT

(75) Inventor: Hajime Futatsugi, Setagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 11/218,507

(22) Filed: Sep. 6, 2005

(65) Prior Publication Data
US 2006/0059211 A1 Mar. 16, 2006

(30) Foreign Application Priority Data
Sep. 10, 2004 (JP) .............................. 2004-264593

(51) Int. Cl.
*G06F 7/00* (2006.01)
(52) U.S. Cl. .......................................... 707/9; 707/204
(58) Field of Classification Search ...................... 707/1, 707/9, 204
See application file for complete search history.

(56) References Cited

U.S. PATENT DOCUMENTS

| | | | | |
|---|---|---|---|---|
| 5,784,560 | A * | 7/1998 | Kingdon et al. ............. | 709/201 |
| 5,878,415 | A * | 3/1999 | Olds ............................... | 707/9 |
| 6,061,684 | A * | 5/2000 | Glasser et al. ................... | 707/9 |
| 6,466,932 | B1 * | 10/2002 | Dennis et al. ................... | 707/3 |
| 6,721,758 | B1 * | 4/2004 | Jex et al. ................ | 707/103 R |
| 6,944,777 | B1 * | 9/2005 | Belani et al. .................... | 707/9 |
| 7,031,962 | B2 * | 4/2006 | Moses ........................... | 707/9 |
| 2003/0188198 | A1 * | 10/2003 | Holdsworth et al. ......... | 713/201 |
| 2005/0021498 | A1 * | 1/2005 | Boreham et al. ............... | 707/1 |

FOREIGN PATENT DOCUMENTS

| | | |
|---|---|---|
| JP | 7-64844 | 3/1995 |
| JP | 2000-215095 | 8/2000 |

OTHER PUBLICATIONS

Perfect Access Permission Control Manual Part 3; Advanced Techniques to Improve Management Efficiency, Windows 2000 World vol. 8, No. 3, Japan, IDG Japan Corp., Mar. 1, 2003, pp. 78-84 (with English Translation).

(Continued)

*Primary Examiner*—Hosain T Alam
*Assistant Examiner*—Jieying Tang
(74) *Attorney, Agent, or Firm*—Fitzpatrick, Cella, Harper & Scinto

(57) ABSTRACT

An information processing apparatus for managing an access right to an object includes a storage unit configured to store objects in a hierarchical structure and a determination unit configured to determine an access right to a low-level object. The low-level object has inheritance information indicating whether or not the low-level object inherits an access right from an object at a higher level. The determination unit determines the access right to the low-level object for the user based on an access right to the low-level object set for the user if the inheritance information of the low-level object is set as "not inherited." Alternatively, the determination unit determines the access right to the low-level object based on an access right to the lowest-level object of the objects at a level higher than the low-level object if the inheritance information of the low-level object is set as "inherited."

18 Claims, 9 Drawing Sheets

OTHER PUBLICATIONS

Mindy Martin, Microsoft Exchange 2000 Web Application Development Technique vol. 2 (Original Title: Programming Collaborative Web Applications with Microsoft Exchange 2000 Server), Apr. 16, 2001 (with partial English Translation).

Fukunaga Yuji, "Access Right to NT File Viewed from Windows 2000," Interop Magazine, vol. 10, No. 12, Japan, Softbank Publishing Co., Dec. 1, 2000 (with English Translation).

* cited by examiner

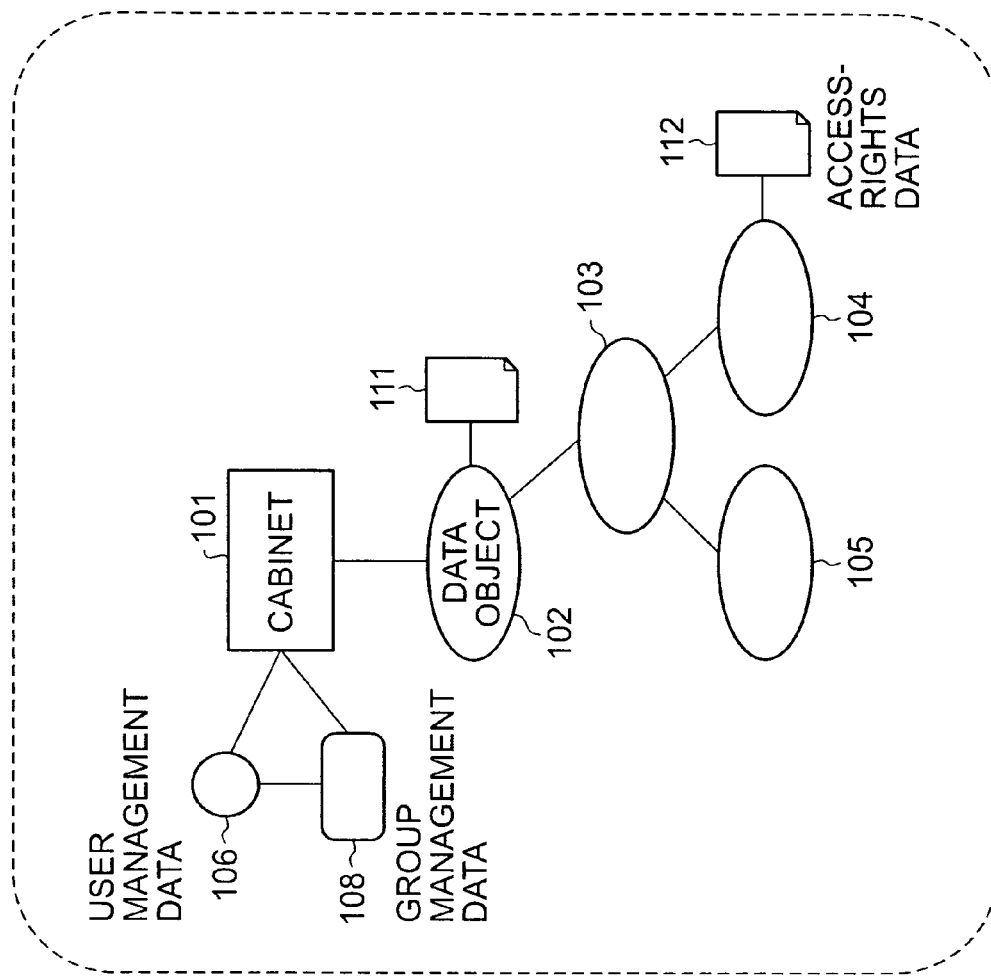
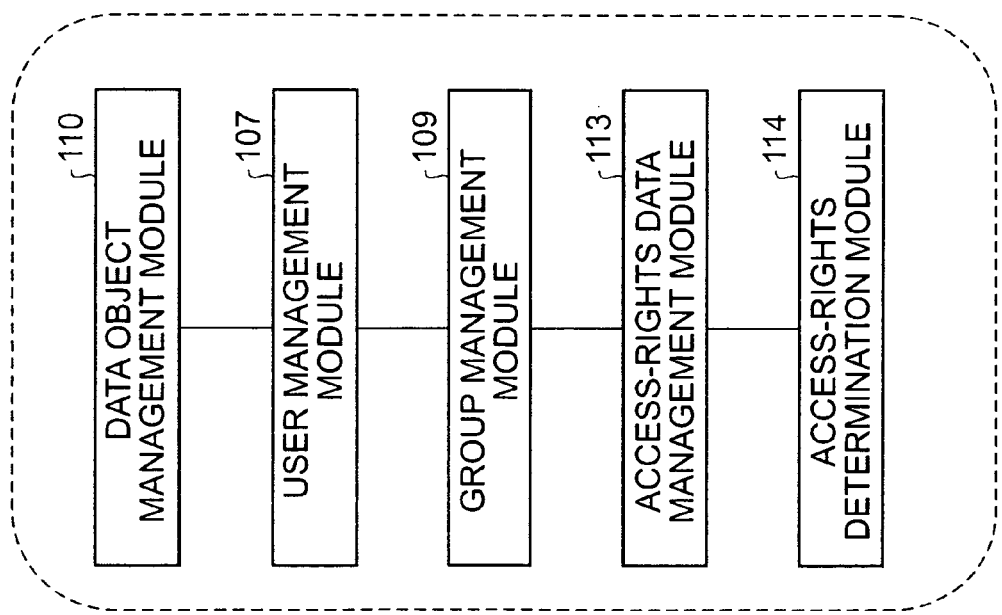

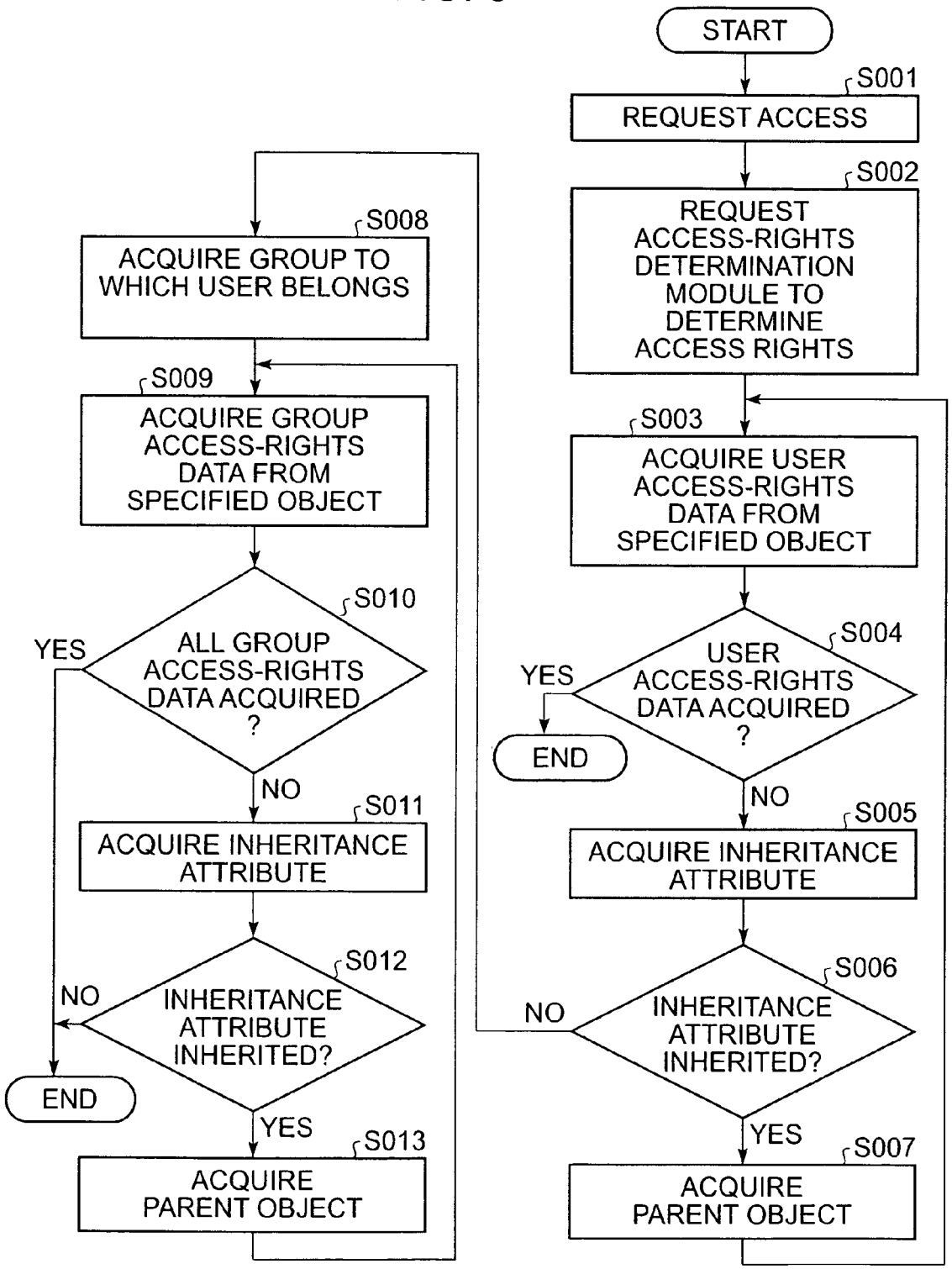

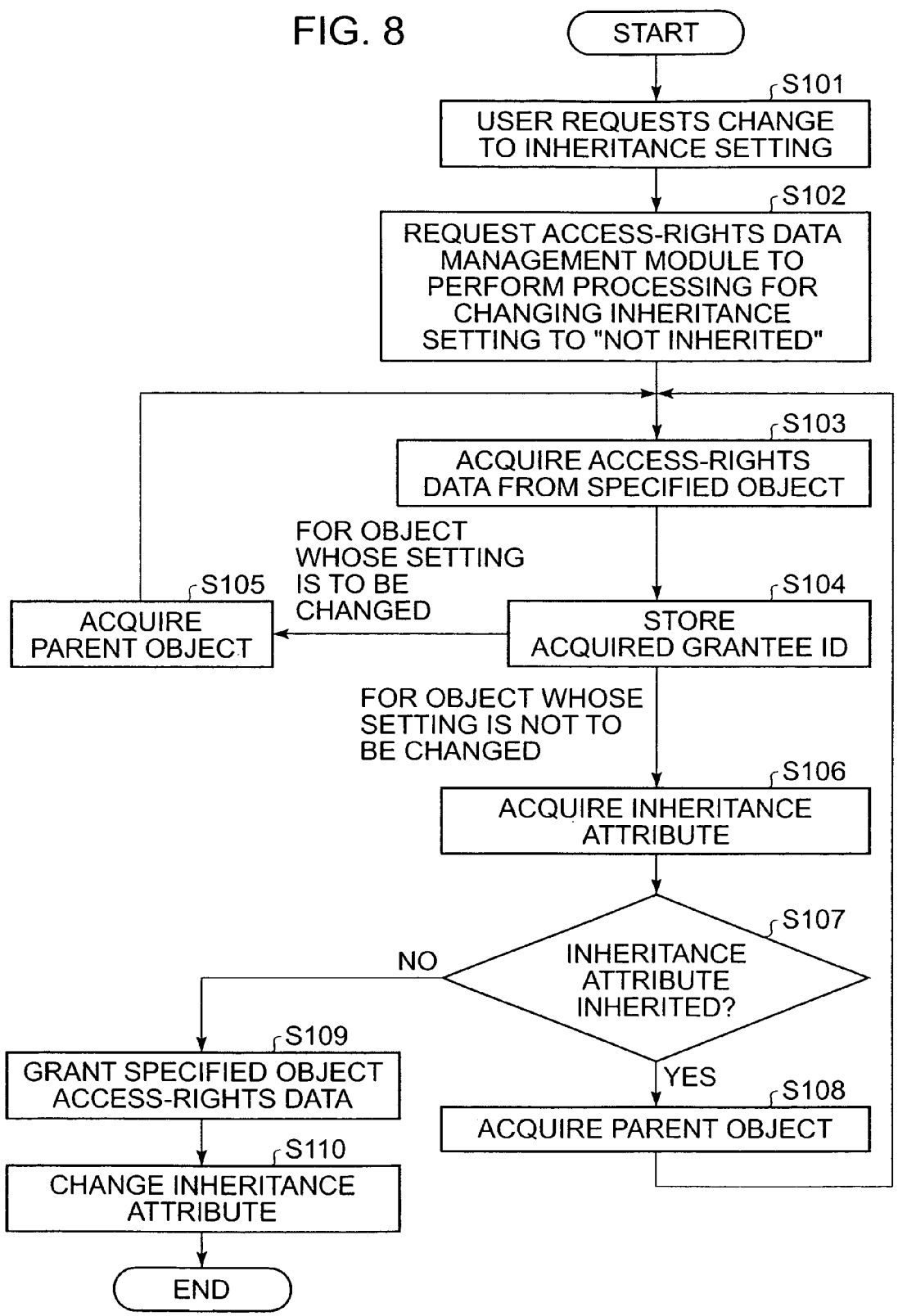

|  | GROUP 1 | GROUP 2 | USER 1 | USER 2 |
|---|---|---|---|---|
| OBJECT A <-> | READ | CHANGE | NO SETTING | NO SETTING |
| OBJECT B <↑> | ADD | NO SETTING | NO SETTING | NO SETTING |
| OBJECT C <↑> | NO SETTING | NO SETTING | NO SETTING | READ |

|  | GROUP 1 | GROUP 2 | USER 1 | USER 2 | USER 3 |
|---|---|---|---|---|---|
| OBJECT A <-> | READ | CHANGE | DELETE | NO SETTING | NO SETTING |
| OBJECT B <↑> | NO SETTING | NO SETTING | NO SETTING | NO SETTING | NO SETTING |
| OBJECT C <↑> | ADD | NO SETTING | NO SETTING | READ | NO SETTING |

|  | GROUP 1 | GROUP 2 | USER 1 | USER 2 | USER 3 |
|---|---|---|---|---|---|
| OBJECT A <-> | READ | CHANGE | DELETE | NO SETTING | NO SETTING |
| OBJECT B <↑> | NO SETTING | NO SETTING | NO SETTING | NO SETTING | NO SETTING |
| OBJECT C <-> | ADD | CHANGE | DELETE | READ | NO SETTING |

|  | GROUP 1 | GROUP 2 | USER 1 | USER 2 |
|---|---|---|---|---|
| OBJECT A <-> | READ | READ | DELETE | NO SETTING |
| OBJECT B <↑> | NO SETTING | CHANGE | NO SETTING | NO SETTING |
| OBJECT C <-> | ADD | DELETE | NO SETTING | READ |

|  | GROUP 1 | GROUP 2 | USER 1 | USER 2 |
|---|---|---|---|---|
| OBJECT A <-> | READ | READ | DELETE | NO SETTING |
| OBJECT B <↑> | NO SETTING | CHANGE | NO SETTING | NO SETTING |
| OBJECT C <↑> | NO SETTING | NO SETTING | NO SETTING | READ |

INFORMATION PROCESSING METHOD AND APPARATUS FOR MANAGING ACCESS RIGHTS TO AN OBJECT

BACKGROUND OF THE INVENTION

1. Field of the Invention

The present invention relates to information processing apparatuses and information processing methods for managing access rights to data objects managed in a hierarchical structure.

2. Description of the Related Art

In typical file systems and document management systems, access to data objects (hereinafter, a data object may be referred to just as an object), such as folders and files, is controlled. In these systems, it is common that data objects are managed in a hierarchical structure, typified by a tree structure. Furthermore, since each data object is given access-rights data for managing access thereto by users, such access-rights data is also managed hierarchically. Since access management is carried out on an object by object basis, all data objects to be access controlled need to have access-rights data. For this reason, as the number of data objects increases, the cost of providing and changing access-rights data and the amount of access-rights data itself increase.

To overcome these problems, as a method for managing access rights to data objects in a hierarchical structure, a technique for allowing low-level data objects in a hierarchy to inherit access rights from high-level data objects in the hierarchy has been proposed. According to this method, access-rights settings of high-level data objects are automatically applied to low-level data objects without a user having to apply access-rights settings to the low-level data objects individually. Therefore, not only is the user relieved of the burden of setting access rights individually, but also it is no longer necessary to hold access-rights data for low-level data objects, contributing to reduction in the amount of data. Still, however, when access rights different from those assigned to a group are to be set only to particular objects in the group, for example, the known technique requires the user first to turn off inheritance of access-rights settings and then to set access rights to the particular objects individually. If the inheritance of access-rights settings is turned off, a change to an access-rights setting of a high-level data object is not automatically applied to lower-level data objects. Thus, once the inheritance of access-rights settings is turned off, the user needs to manually set access rights to low-level data objects if the low-level data objects should have the same access-rights settings as those of a high-level data object.

To do this, the user needs to individually determine which data objects should inherit access-rights settings from higher-level data objects before manually applying access-rights settings to the data objects. Such manual access-rights setting may not be difficult for a small number of data objects. However, if access rights of higher-level data objects, which are likely to have many subordinate data objects, are changed, applying the above-described manual setting to those many subordinate data objects is nearly impossible. Thus, with the known technique, users have difficulty in performing flexible access-rights setting.

SUMMARY OF THE INVENTION

The present invention may provide an information processing apparatus that enables users to perform flexible access-rights setting while still allowing low-level data objects in a hierarchical structure to inherit access rights from high-level data objects.

According to one aspect of the present invention, an information processing apparatus for managing an access right to an object includes a storage unit configured to store objects that are hierarchically managed, the objects including a low-level object having inheritance information indicating whether or not the low-level object inherits an access right from an object at a higher level. A determination unit is configured to determine an access right to the low-level object for a user. The determination unit determines the access right to the low-level object for the user based on an access right to the low-level object set for the user, if the inheritance information of the low-level object indicates that inheritance is not performed, and the determination unit determines the access right to the low-level object for the user based on an access right, set for the user, to the lowest-level object for which an access right is set for the user, from among the low-level object and at least one object at a level higher than the low-level object, if the inheritance information of the low-level object indicates that inheritance is performed.

According to another aspect of the present invention, an information processing method for managing an access right to an object includes the steps of storing into a storage unit objects that are hierarchically managed, the objects including a low-level object having inheritance information indicating whether or not the low-level object inherits an access right from an object at a higher level. An access right to the low-level object for a user is determined. In the determining step, the access right to the low-level object for the user is determined based on an access right to the low-level object set for the user, if the inheritance information of the low-level object indicates that inheritance is not performed, and the access right to the low-level object for the user is determined based on an access right, set for the user, to the lowest-level object for which an access right is set for the user, from among the low-level object and at least one object at a level higher than the low-level object, if the inheritance information of the low-level object indicates that inheritance is performed.

According to still another aspect of the present invention, a computer-readable medium storing a computer-executable program causes a computer to execute the above-described information processing method.

Further features of the present invention will become apparent from the following description of exemplary embodiments (with reference to the attached drawings).

BRIEF DESCRIPTION OF THE DRAWINGS

FIGS. 2A and 2B illustrate functional structures for data object management according to the first embodiment.

FIG. 6 is a flowchart illustrating access-rights determination processing according to the first embodiment.

FIG. 8 is a flowchart illustrating the process of changing an inheritance attribute (from "inherited" to "not inherited") according to the first embodiment.

FIGS. 10A to 10E are diagrams depicting examples of access-rights data settings for data objects.

DETAILED DESCRIPTION OF THE INVENTION

Embodiments according to the present invention will now be described.

FIRST EMBODIMENT

Figure 1:
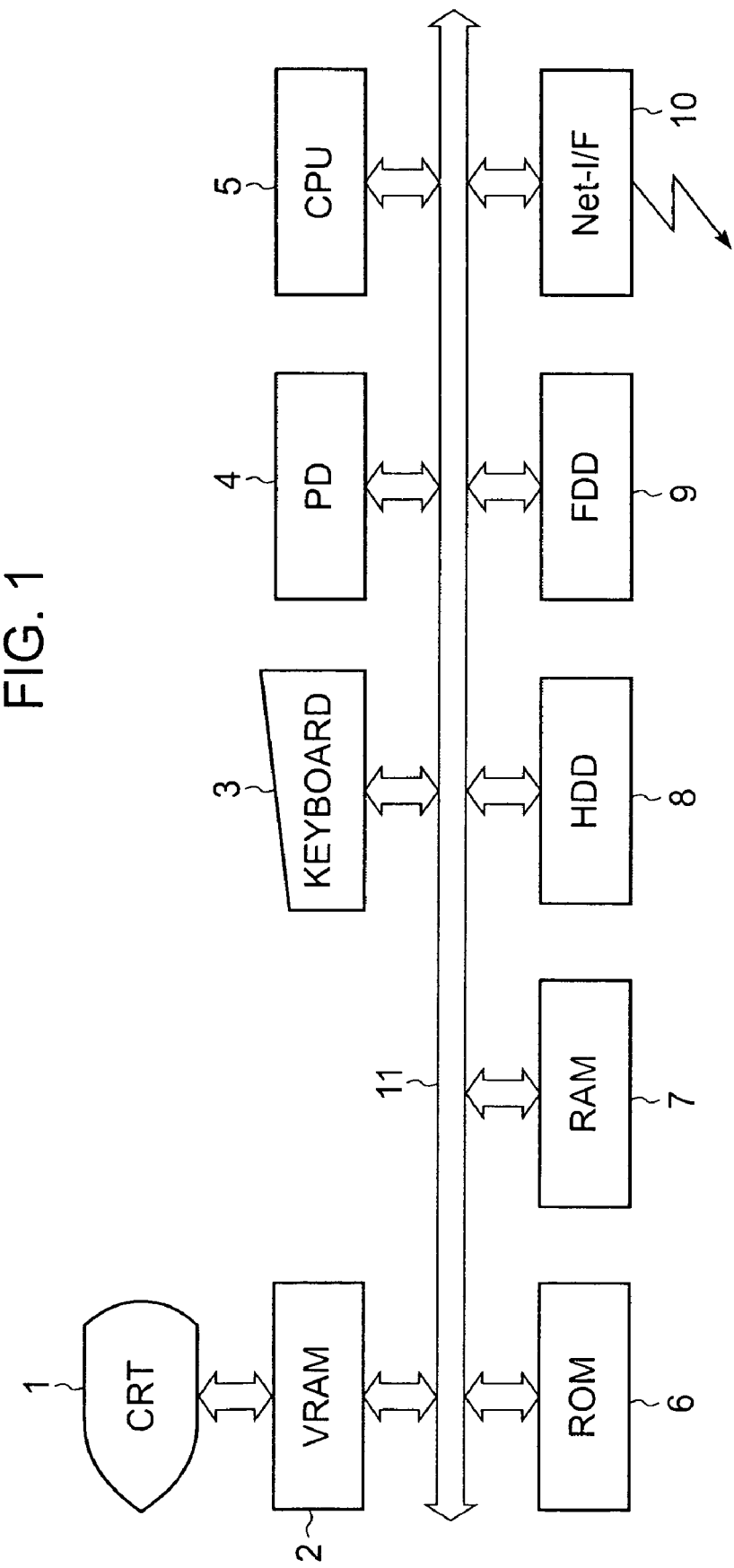
FIG. 1 is a block diagram depicting the structure of a data processing apparatus for realizing data object management according to a first embodiment.

FIG. 1 is a block diagram depicting the structure of a data processing apparatus according to a first embodiment. Referring to FIG. 1, a display unit 1, for example, a cathode ray tube (CRT), displays information about data and various types of message menus being processed by application programs. VRAM 2 is a video RAM (hereinafter, referred to as a VRAM) into which images to be displayed on the screen of the display unit 1 are loaded. A keyboard 3 and a pointing device (PD) 4 are used, for example, to input characters in predetermined fields on the screen and to point buttons or icons on graphic user interfaces (GUIs). A CPU 5 controls the data processing apparatus.

A ROM 6 stores operating procedures (programs) for the CPU 5. ROM 6 further stores programs for processes corresponding to the flowcharts to be described below, as well as application programs for data processing and error handling programs. A RAM 7 is used as a work area by the CPU 5 to execute the above-described various types of programs and as a temporary storage area for error handling. Control programs stored in a hard disk drive (hereinafter, referred to as a HDD) 8 may be loaded into the RAM 7 as required so that the CPU 5 can execute the control programs.

The hard disk drive 8 and a Floppy® disk drive (hereinafter, referred to as a FDD) 9 are used to save and read application programs, libraries, and other data. Instead of or in addition to the FDD 9, optical disk drives, such as CD-ROMs, MOs, and DVDs, or magnetic tape drives, such as tape streamers and DDS's, may be provided.

A network interface 10 is an interface for connecting the data processing apparatus to a network. An I/O bus 11 includes an address bus, a data bus, and a control bus to connect among the above-described units.

FIG. 2A shows the structure of functional modules for realizing data object management according to this embodiment. FIG. 2B is a schematic diagram depicting data objects managed according to data object management of this embodiment. Data in FIG. 2B may be stored in the HDD 8, and the functional modules in FIG. 2A may be executed by the CPU 5 according to programs stored in the HDD 8.

Referring to FIG. 2B, a cabinet 101 is the largest unit used for data object management of this system, located at the top level of the hierarchical structure of data objects, such as folders and files. Data objects 102 to 105 are arranged below the cabinet 101. The data objects 102 to 105 may be folders or document data, details of which are not described here. The data object 102 in FIG. 2B is directly below the cabinet 101, and is arranged at the top level of the data hierarchy. The data objects 103 to 105 are arranged at lower levels than the data object 102.

Users of data objects arranged below the cabinet 101 are registered in user management data 106. A user management module 107 in FIG. 2A manages registration and de-registration of users by using the user management data 106. User groups are registered in group management data 108. A group management module 109 manages registration and de-registration of users in and from groups by using the group management data 108.

A data object management module 110 manages the data objects 102 to 105, and controls an access-rights determination module 114, to be described below, to perform access-rights determination processing in response to a user request for data. Access-rights data 111 and 112 hold information for controlling user access to the data objects 102 to 105 arranged below the cabinet 101. In FIG. 2B, the data objects 102 and 104 are provided with access-rights data 111 and 112, respectively. An access-rights data management module 113 provides the data objects 102 to 105 arranged below the cabinet 101 with access-rights data. In response to a request from the data object management module 110, the access-rights determination module 114 determines access rights to data objects for users and groups based on access-rights data associated with the data objects.

The structures of the above-described various types of data will be described with reference to FIGS. 3A to 3D.

Figure 3A:
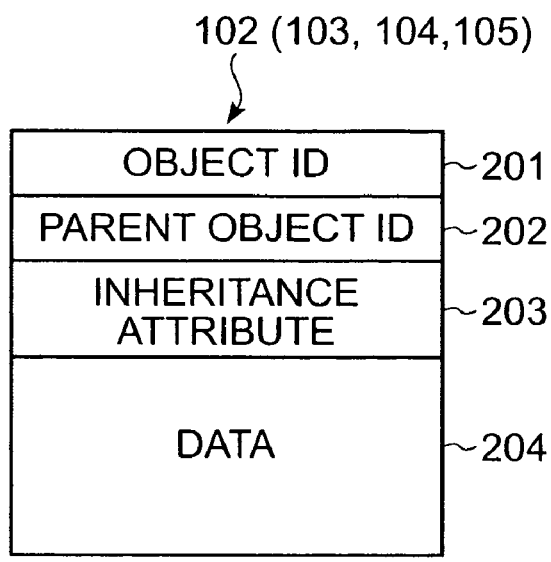
FIGS. 3A to 3D illustrate example structures of data used for data object management according to the first embodiment.

FIG. 3A shows an example data structure of a data object, for example, the data objects 102 to 105 according to this embodiment. The data structure is described by way of example of the data object 102. An object ID 201 is data for uniquely identifying the data object 102 in the system. A parent object ID 202 is data for identifying the data object arranged just above the data object 102 in the data hierarchy (hereinafter, referred to as the parent object). An inheritance attribute 203 indicates whether or not access rights to the data object 102 are inherited from a high-level data object in the hierarchy. The inheritance attribute 203 holds a Boolean value 0 or 1, where 0 indicates "not inherited" and 1 indicates "inherited." Data 204 is the main body of the data object 102. The data object arranged at the top level of the data hierarchy, such as the data object 102 in FIG. 2, has no higher-level data objects, and has no value in the parent object ID 202. Furthermore, since the data object arranged at the top level of the data hierarchy cannot inherit access rights from higher-level data objects, it has "not inherited" (i.e., "0") set in the inheritance attribute 203.

Figure 3B:
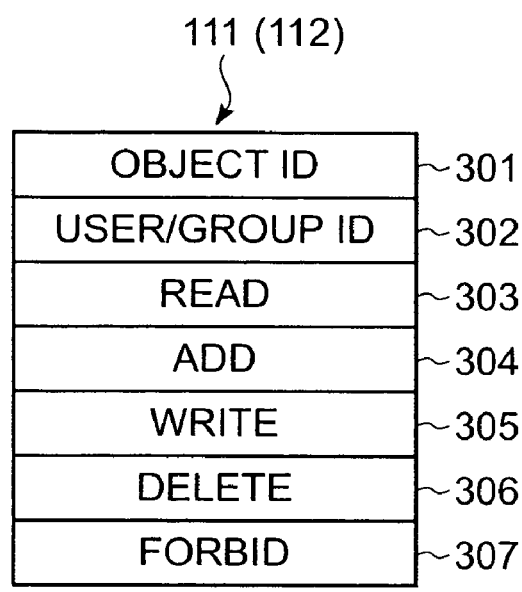

FIG. 3B illustrates an example data structure of access-rights data, for example, the access-rights data 111 and 112 according to this embodiment. The data structure is described by way of example of the access-rights data 111. An object ID 301 is data for identifying the data object to which a user or group is permitted to have access according to the access-rights data 111. Hereinafter, such a user or group may be referred to as the grantee of the access-rights data. A user/group ID 302 is an ID for identifying the user or group as the grantee of the access-rights data 111. Data items 303 to 307 each corresponds to an access right. The READ data item 303 corresponds to the read right, which includes the right to read the data object identified with the object ID 301. The ADD data item 304 corresponds to the create right, which includes the right to create a data object below the data object identified with the object ID 301. The WRITE data item 305 corresponds to the change right, which includes the right to change contents of the data object identified with the object ID 301. The DELETE data item 306 corresponds to the delete right, which includes the right to delete the data object identified with the object ID 301. The FORBID data item 307 corresponds to the forbid right, which includes a flag to prohibit access to the data object identified with the object ID 301. The FORBID right is given priority over the other access-rights settings, where "1" indicates that any type of access to the data object identified with the object ID 301 is prohibited and "0" indicates that at least one type of access to the data object is permitted. Each of the access rights has a Boolean value 0 or 1.

Figure 3C:
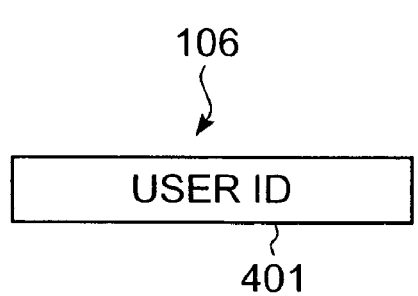

FIG. 3C illustrates an example data structure of user management data, for example, the user management data 106 according to this embodiment. A user ID 401 is data for uniquely identifying the user in the system. According to this embodiment, the user management data 106 includes only this component. However, for example, if a structure containing a plurality of cabinets is used, an identifier for identifying the cabinet associated with the user may be included as an additional component.

Figure 3D:
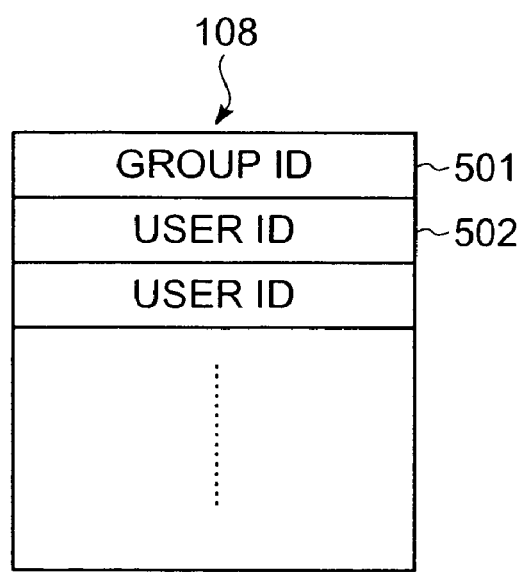

FIG. 3D illustrates an example data structure of group management data, for example, the group management data 108 according to this embodiment. A group ID 501 is data for uniquely identifying the group. User IDs 502 identify users registered in this group. According to this embodiment, it is assumed that the user IDs 502 of users registered in the group identified by the group ID 501 are listed. Just like the above-described user management data 106, if there is a plurality of cabinets, an identifier for identifying the cabinet associated with the group may be included as an additional component.

Figure 4:
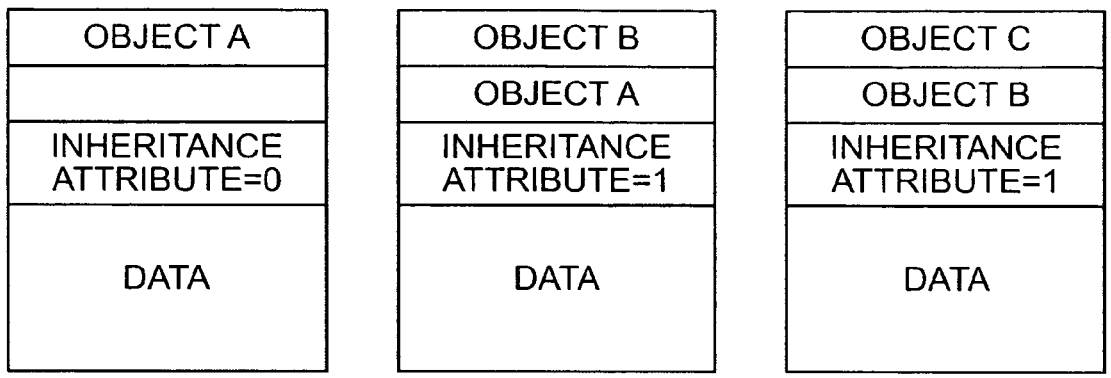
FIG. 4 is a diagram depicting example data structures of data objects having the access-rights data settings shown in Table 1001 of FIG. 10A.

The flow of access-rights determination processing in the system according to this embodiment will be described. Table 1001 in FIG. 10A shows example settings of the inheritance attribute in data objects and example settings of access-rights for groups and users. The first column of Table 1001 includes the object IDs of data objects. Data objects with object IDs in upper rows of Table 1001 correspond to data objects at higher levels in the hierarchy. More specifically, an object A indicates an object arranged just below the cabinet 101, and its inheritance attribute is set as "not inherited" (indicated by <--> in Table 1001). An object B indicates an object arranged just below the object A. Its inheritance attribute is set as "inherited" (indicated by <↑> in Table 1001) and has the object A as a parent object ID. An object C indicates an object arranged just below the object B. Its inheritance attribute is set as "inherited" and has the object B as a parent object ID. Symbols <--> and <↑> have the same meaning in Tables 1002 to 1005, shown in FIGS. 10B to 10E. The data structures of the above-described objects A to C are shown in FIG. 4.

Figure 5A:
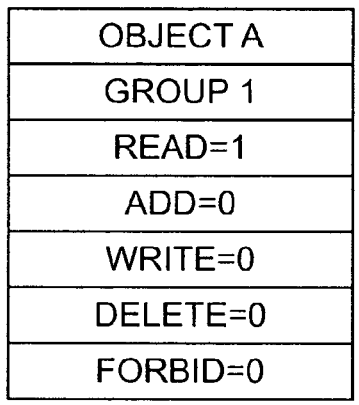
FIGS. 5A and 5B are diagrams depicting an example of an access-rights determination result and an example of user registration in a group management data structure.
Figure 5B:
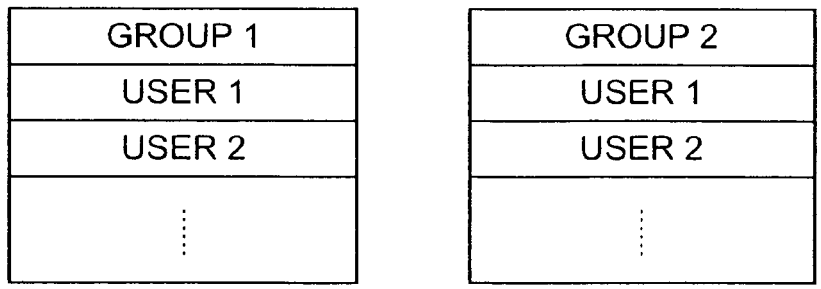

The second and third columns of Table 1001 indicate settings of access-rights data of the objects A to C for group 1 and group 2 registered in the cabinet 101. For example, according to Table 1001, the object A has access-rights data indicating that group 1 has an access-right to read the object A. The structure of access-rights data of the object A for group 1 is shown in FIG. 5A. FIG. 5A shows that the access right set to "1", i.e., the read right (READ) is permitted and that the access rights set to "0" (create right (ADD), change right (WRITE), and delete right (DELETE)) are not permitted. In Table 1001, cells marked with "no setting" indicate that the corresponding objects are not provided with access-rights data. The fourth and fifth columns of Table 1001 indicate settings of access-rights data of the objects A to C for user 1 and user 2 registered in the cabinet 101. Just like groups 1 and 2, cells marked with "no setting" indicate that the corresponding objects are not provided with access-rights data. As shown in FIG. 5B, it is assumed that user 1 and user 2 are registered as members in both group 1 and group 2.

An access-rights determination method, according to this embodiment, with the above-described structure will be described. This embodiment assumes that an access-rights determination is made in accordance with the following rules.

[Rule 1]: If the data object in question has a plurality of higher-level data objects, the data object in question uses the access rights to the data object at the lowest level from among the plurality of data objects.

[Rule 2]: User access rights have priority over group access rights.

[Rule 3]: If no user access rights are set, access rights of the group to which the user belongs are used.

[Rule 4]: If a plurality of group access rights is set, the logical OR among them is used.

Access-rights determination processing according to this embodiment will be described with reference to the flowchart in FIG. 6. The following description assumes that user 1 accesses the object C.

Figure 7A:
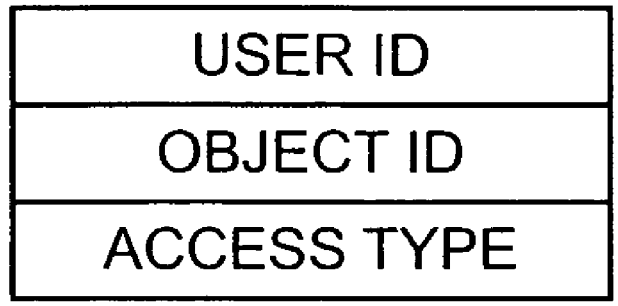
FIGS. 7A and 7B are diagrams depicting an example data structure of data for requesting access to a data object and an example data structure of an access-rights determination result.

First, user 1 requests access to the object C through the data object management module 110 (step S001). FIG. 7A shows the structure of data for requesting access to a data object. As shown in FIG. 7A, data for requesting access to a data object includes a user ID, an object ID, and an access type. In this example, since user 1 requests access to the object C, this access request includes the user ID of user 1, the object ID of the object C, and the identifier indicating the access type. The data object management module 110 extracts the user ID and the object ID from the data for requesting access and requests the access-rights determination module 114 to determine access rights of the object C for user 1 (step S002).

The access-rights determination module 114, which has been requested to determine access rights, acquires user access rights or group access rights set in relation to the relevant data object through the processing in steps S003 to S012.

The access-rights determination module 114 attempts to acquire access rights according to the above-described [Rule 1] and [Rule 2], namely, by giving priority to a low-level object over a high-level object and to user access rights over group access rights (step S003 to S007). If the acquisition of user access rights fails in the processing of steps S003 to S007, an attempt is made to acquire access rights of the group to which user 1 belongs according to [Rule 3] and to set the acquired access rights of the group as the access rights for user 1 (step S008 to S013).

First, an attempt is made to acquire user access-rights data from the specified object (starting with the data object to which access has been requested, i.e., the object C in this example). If acquisition succeeds, the processing ends (steps S003 and S004). If acquisition fails, the inheritance attribute 203 set for the object is acquired to determine whether the current setting indicates that the settings of the parent object are inherited (steps S005 and S006). If the current setting indicates that the settings of the parent object are inherited, the parent object is identified based on the parent object ID 202 of the data object and an attempt is made to acquire access rights set for the user of the parent object (steps S007 and S003). The processing from step S003 to step S007 is repeated until user access rights are acquired. If a data object with the inheritance attribute set as "not inherited" appears before user access rights can be acquired, an attempt is made to acquire access rights set for the group to which user 1 belongs (step S008 and the subsequent steps).

First, the group to which user 1 belongs is acquired before attempting to acquire access-rights data to the object C for the group. If user 1 belongs to a plurality of groups, access-rights data of all groups to which user 1 belongs are acquired. When access rights for all groups are acquired, this processing ends (steps S008, S009, and S010). If there is a group whose access-rights data has not been acquired, the inheritance attribute 203 of the object is acquired (step S011) to determine whether the current setting is "inherited" (step S012). If the current setting is "inherited," the parent object is identified from the parent object ID 202 of the data object, and an attempt is made to acquire group access rights of the parent object (steps S013 and S009). The processing in steps S009 to S013 is repeated until access rights set for all groups to which user 1 belongs are acquired. If a data object with the inheritance attribute set as "not inherited" is encountered, this processing ends even if there is a group whose access rights have not been acquired (step S012). In this manner, acquisition of access-rights data is carried out for all groups to which user 1 belongs.

The following description assumes that user 1 requests access to the object C in the same conditions as in the above-described example, namely, with the settings in Table 1001. First, the access-rights data for user 1 are acquired from the object C (step S003). As shown in Table 1001, since user 1 is not provided with access-rights data, the access-rights determination module 114 acquires the inheritance attribute of the object C (steps S004 and S005). Since the inheritance attribute of the object C has the setting "inherited" (inheritance attribute=1) as shown in FIG. 4, access-rights determination needs to be made based on access-rights data of a higher-level object. For this purpose, access-rights data for user 1 in relation to the object B, which is the parent object of the object C, is acquired (steps S006, S007, and S003). According to Table 1001, access-rights data for user 1 is not acquired in this step. Since the inheritance attribute of the object B is "inherited" (inheritance attribute=1), an attempt is made to acquire access-rights data for user 1 in relation to the object A serving as the parent object of the object B (steps S004 to S007 and S003).

Access-rights data for user 1 is not acquired again. Since the object A is arranged at the top level in the data hierarchy with the inheritance attribute set to "not inherited" (inheritance attribute=0), access-rights data cannot be acquired from objects at levels higher than the level of the object A. As described above, if access-rights data for the user in question is not acquired before the hierarchy is traced up to an object with the inheritance attribute set as "not inherited," the flow proceeds from step S006 to step S008 in order to make an access-rights determination based on access-rights data of a group to which the user belongs in accordance with [Rule 3].

The access-rights determination module 114 acquires the groups to which user 1 belongs (step S008). As shown in FIG. 5B, if group 1 and group 2 are acquired as groups to which user 1 belongs, the access-rights determination module 114 acquires access-rights data for both the groups in relation to the object C (step S009). As shown in Table 1001, since neither group 1 nor group 2 is given access-rights data for accessing the object C, the access-rights determination module 114 then acquires group access-rights data in relation to the object B, which is the parent object of the object C (steps S010 to S013 and S009). According to Table 1001, access-rights data for group 1 is acquired in relation to the object B, whereas access-rights data for group 2 is not acquired because group 2 does not have access-rights data for object B.

Since not all access-rights data for the groups to which user 1 belongs have been acquired at this point, a further attempt is made to acquire access-rights data for group 2 (steps S010, S011, and S012). Access-rights data for group 2 is acquired from the object A, which is the parent object of the object B (steps S013 and S009). The access-rights data for group 1 in relation to the object B has already been acquired, and hence the access-rights data for group 1 in relation to the object A is not acquired at this point in accordance with the above-described [Rule 1]. According to Table 1001, access-rights data exists for group 2 in relation to the object A, therefore this access-rights data is acquired. Now, access-rights data of all groups to which user 1 belongs has been acquired, so this process is terminated (step S010) and access-rights determination processing begins.

Figure 7B:
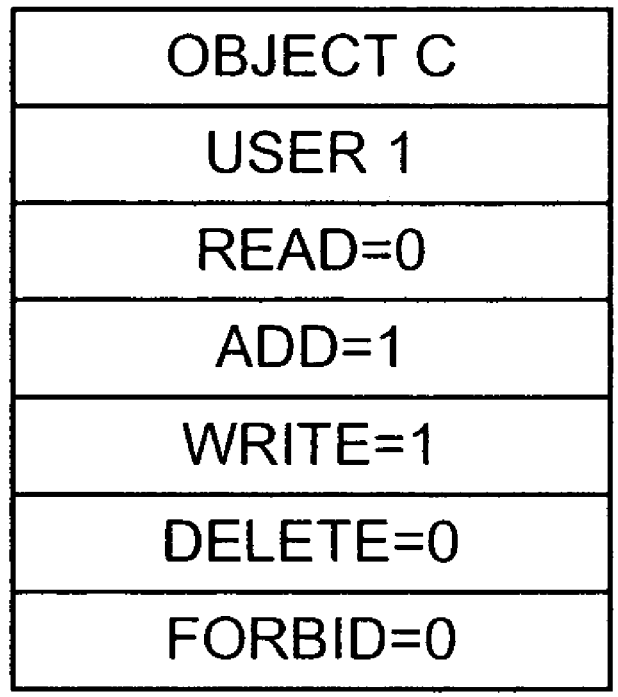

According to this embodiment, the logical OR among access rights of the groups to which the user belongs is used as the user access rights in accordance with [Rule 4]. The create (ADD)/change (WRITE) rights generated as a result of the logical OR between group 1 (create right (ADD)) and group 2 (change right (WRITE)) is calculated as the final access rights (hereinafter, referred to as a result value) for user 1. Based on this result, the access-rights determination module 114 generates the access-rights data shown in FIG. 7B and passes it to the data object management module 110. The data object management module 110 compares the access-rights data (shown in FIG. 7B) passed from the access-rights determination module 114 with the access type included in the access request (shown in FIG. 7A) to determine whether access to the object C by user 1 is permitted or not.

A case where user 2 accesses the object C is described below. Also in this case, access-rights data given to user 2 is acquired from the object C according to [Rule 2] (step S003). According to Table 1001, access-rights data (READ) for user 2 is acquired at this point, and the processing is terminated in step S004. The acquired access rights for user 2 are passed from the access-rights determination module 114 to the data object management module 110. The subsequent processing is the same as described above, and thus will not be repeated.

Access-rights determination processing by the access-rights determination module 114 according to the first embodiment has been described.

Figure 9:
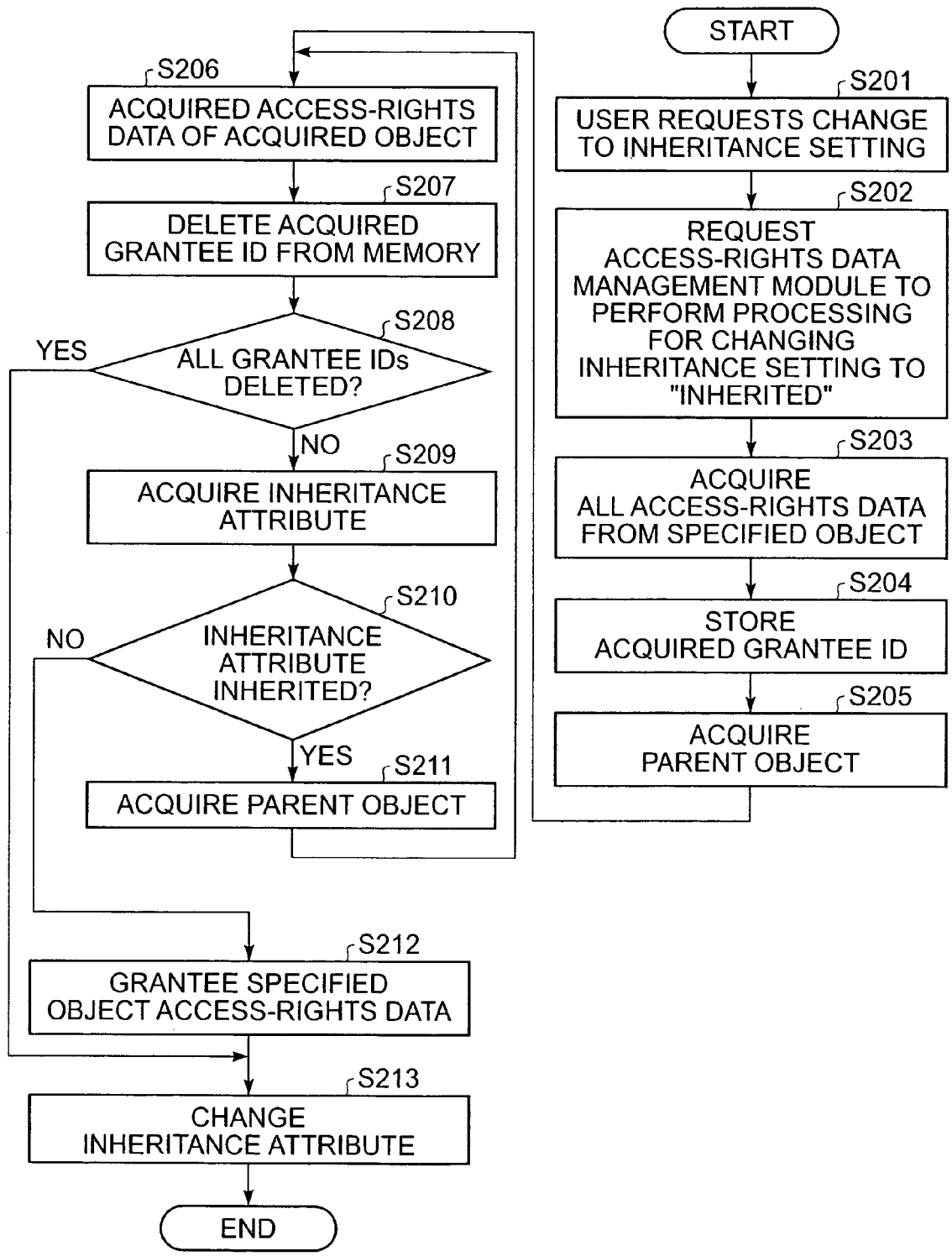
FIG. 9 is a flowchart illustrating the process of changing an inheritance attribute (from "not inherited" to "inherited") according to the first embodiment.

The process of changing the inheritance attributes in data objects will be described with reference to the flowcharts in FIGS. 8 and 9. First, the process of changing the inheritance attribute from "inherited" to "not inherited" is described with reference to the flowchart in FIG. 8.

When a request to change the inheritance setting is input by a user (step S101), the data object management module 110 requests the access-rights data management module 113 to change the inheritance setting of a specified data object to "not inherited" (step S102). The access-rights data management module 113 carries out the subsequent steps S103 to S108 to generate a duplicate of the access-rights data of the data object (acquires all access-rights data set for the object), and sets access-rights data based on this duplicate to change the inheritance attribute of the object in steps S109 and S110.

First, the access-rights data is acquired from the specified object, and the group ID and the user ID of the grantee of the acquired access-rights data are stored (steps S103 and S104). Thereafter, the parent object of the object in question is acquired, and the group ID and the user ID of the grantee of the access-rights data from the acquired object are additionally stored (steps S105, S103, and S104).

Next, the inheritance attribute in the object acquired in the above-described step S105 is acquired to determine whether the inheritance setting is set as "inherited" (steps S106 and S107). If the inheritance attribute is set as "inherited," the parent object of that object is further acquired, and the group ID and the user ID of the grantee of the access-rights data from the newly acquired object are additionally stored (steps S108, S103, and S104). Subsequently, steps S106 to S108, S103, and S104 are repeated until it is determined that the inheritance attribute of the object acquired in step S105 is "not inherited." When it is determined that the inheritance attribute of the object is "not inherited," the process proceeds from step S107 to step S109.

In step S109, access-rights data is acquired based on the grantee IDs stored in step S104 through the above-described repeated processing, and the acquired access-rights data is given to the object whose inheritance setting is to be changed. In step S110, the inheritance attribute of the object in question is changed from "inherited" to "not inherited." If in step S104 the grantee ID is stored in association with the access-rights data acquired in step S103, the access-rights data stored in step S103 can be given to the user or the group (grantee) identified with the corresponding grantee ID In step S109.

The above-described processing of changing an inheritance attribute will be described in detail with reference to Table 1002 and Table 1003 shown in FIGS. 10B and 10C, respectively. The initial settings of access-rights data before the inheritance attribute of the object C is changed from "inherited" to "not inherited" are shown in Table 1002. Table 1003 shows settings of access-rights data after the inheritance attribute of the object C has been changed. The meaning of items in Tables 1002 and 1003 has already been described with reference to Table 1001. The object A has the inheritance attribute set as "not inherited," while the objects B and C have the inheritance attributes set as "inherited."

First, when a request to change the inheritance setting of the object C is input by the user to the data object management module 110 (step S101), the data object management module 110 requests the access-rights data management module 113 to perform processing to change the inheritance setting of the object C (step S102).

The access-rights data management module 113 acquires all access-rights data assigned to the object C through the processing in steps S103 to S108. According to Table 1002, the access-rights data for group 1 and user 2 are acquired through this processing. The user ID and the group ID of the grantees of the acquired access rights are stored by the access-rights data management module 113 during this processing (step S104). Next, all access-rights data for the object B, which is the parent object of the object C, are acquired, except for access-rights data for the grantees that have been stored in the above-described processing (e.g., group 1 and user 2) (steps S105 and S103). Then, the grantees of the acquired access-rights data are stored (step S104). According to Table 1002, since no access rights are assigned to the object B, no access-rights data is acquired through this processing.

Thereafter, the inheritance attribute of the object B is acquired (step S106). Since the inheritance attribute of the object B is "inherited," all access-rights data are acquired from the object A, which is the parent object of the object B, except for access-rights data for the grantees stored through the processing in step S104 (e.g., group 1 and user 2) (steps S106 to S108 and S103). The grantees of the acquired access-rights data are stored (step S104). According to Table 1002, access-rights data for group 2 and user 1 are acquired through this processing. Thereafter, the inheritance attribute of the object A is acquired (step S106). Since the inheritance attribute of the object A is "not inherited," it is not necessary to duplicate access-rights data from a level higher than this level, and thus the processing is terminated here (step S107).

Next, all access-rights data acquired from the objects except the object C are given to the object C (step S109). In the example of Table 1002 and Table 1003, the access-rights data for group 2 and user 1 are given to the object C. Since no access-rights setting are assigned to user 3 in this data object hierarchy, no access-rights data for user 3 is added to the object C. Finally, the data object management module 110 sets the inheritance attribute of the object C to "not inherited" and completes this processing (step S110). The settings at this point are shown in Table 1003.

Next, the process of changing an inheritance attribute from "not inherited" to "inherited" is described with reference to the flowchart in FIG. 9. According to this embodiment, when the inheritance attribute is to be changed to "inherited," whether to maintain or discard access-rights data assigned to the object to be changed can be selected. To discard, the access-rights data for all groups and users of the object is changed to "no setting" and the inheritance attribute of the object is changed to "inherited." The following description focuses on a case where access-rights data for the object to be changed is maintained.

When a request to change the inheritance setting is input by the user, the data object management module 110 requests the access-rights data management module 113 to change the inheritance setting (steps S201 and S202).

The access-rights data management module 113 acquires all access-rights data of the specified object (step S203) and stores in a memory (e.g., the RAM 7) the user ID and group ID of the grantees of the acquired access-rights data as grantee IDs (step S204). Next, the parent object of the specified object is acquired by referring to the parent object ID 202 of the specified object, and the access-rights data set for the acquired parent object is acquired (steps S205 and S206). From among the stored grantee IDs, the IDs corresponding to the user ID and the group ID of the grantees of the acquired access-rights data are deleted from the memory (step S207). The processing in steps S206 and S207 may include determining whether or not access-rights data is set to the stored grantee ID and deleting grantee IDs having access-rights data from the memory. When no grantee IDs are stored in the memory as a result of the processing in step S207, the flow proceeds to step S213. If there is still a grantee ID stored in the memory, the flow proceeds to step S209 (step S208).

If there remains a grantee ID stored in the memory, the inheritance attribute of the object in question is acquired. If the inheritance attribute is set as "inherited," the parent object is acquired and the processing in step S206 and the subsequent processing is repeated (steps S209, S210, and S211). If the inheritance attribute is set as "not inherited" in step S210, the access rights for the user IDs and group IDs stored as grantee ID in relation to the specified object (the object whose inheritance attribute is to be changed) are set to the access rights acquired in step S203 (step S212) and the inheritance attribute of the object in question is set to "inherited" (step S213). In step S212, the access-rights data originally set for the specified object is set to the grantee ID remaining in the memory. Therefore, if in step S204 the access-rights data acquired in step S203 is stored in association with the IDs of the grantees, the access-rights data corresponding to a grantee ID that has not been deleted can be acquired in step S212.

The processing outlined above is described in more detail with reference to Table 1004 and Table 1005 shown in FIGS. 10D and 10E, respectively. Table 1004 shows initial settings of data objects before an inheritance attribute is changed. The meaning of items in Tables 1004 and 1005 has already been described with reference to Table 1001. The objects A and C have the inheritance attributes set as "not inherited," while the object B has the inheritance attribute set as "inherited."

First, receiving a request to change the inheritance attribute from a user, the data object management module 110 requests the access-rights data management module 113 to change the inheritance setting of the object C (steps S201 and S202). The access-rights data management module 113 acquires all access-rights data assigned to the object C (step S203). According to Table 1004, the access-rights data for group 1, group 2., and user 2 are acquired. The user IDs and group IDs of the grantees of the acquired access rights are stored as grantee IDs by the access-rights data management module 113 during this processing (step S204).

Next, the access-rights data for the grantees stored during the above-described processing is acquired from the object B, which is the parent object of the object C (step S206). According to Table 1004, the access-rights data for group 2 is acquired through this processing. The IDs of the grantees of the acquired access-rights data are deleted from the grantees that have been stored (step S207) (e.g., the setting for group 2 is deleted). At this point, since a grantee ID remains in the memory (e.g., settings group 1 and user 2), the inheritance attribute of the object B is acquired (steps S208 and S209). Since the inheritance attribute of the object B is "inherited," the access-rights data for the grantee IDs that have been stored is acquired from the object A, which is the parent object of the object B (steps S210, S211, and S206). According to Table 1004, the access-rights data for group 1 and user 1 are acquired, and hence the grantee IDs of the acquired access-rights data are deleted from among the grantee IDs that have been stored in memory (step S207) (e.g., the setting for group 1 is deleted).

Thereafter, because all grantee IDs have not been deleted (step S208), the inheritance attribute of the object A is acquired (step S209). Since the inheritance attribute of the object A is "not inherited," access rights from a level higher than this level cannot be inherited, and therefore the processing is terminated (step S210). Through the above-described processing, the access-rights data for group 1, group 2, and user 1 are acquired from higher levels. According to this embodiment, if a grantee has access-rights data to an object at a level higher than the level of the object whose inheritance attribute is to be changed and the same grantee has access-rights data to the object whose inheritance attribute is to be changed, then the access-rights data to the object whose inheritance attribute is to be changed is deleted. In short, the access-rights data for group 1, group 2, and user 1 are deleted from the object C (step S212). This process is ended by the data object management module 110 setting the inheritance attribute of the object C to "inherited" (step S213). The settings of the access-rights data as a result of this processing are shown in Table 1005.

As described above, according to this embodiment, whether or not to inherit access rights of a parent folder can be set with an inheritance attribute. This allows a hierarchically managed object to inherit the access rights of high-level objects while still enabling flexible access-rights setting.

Furthermore, according to the above-described embodiment, when an inheritance attribute is changed, the access-rights settings before the change are automatically maintained.

SECOND EMBODIMENT

In the first embodiment, user access-rights data is given priority over group access-right data. In a second embodiment, users and groups are given the same level of priority, and access rights for a user are calculated based on the logical OR among the access-rights data given to the individual user and the access-rights data given to all groups to which the user belongs.

More specifically, the following access-rights determination rules are used.

[Rule 1]: If the data object in question has a plurality of higher-level data objects, the data object in question uses the access rights to the data object at the lowest level from among the plurality of data objects.

[Rule 2]: The logical OR among the access rights for the user and the access rights for the groups to which the user belongs is used.

[Rule 3]: If no user access rights are set, access rights of the group to which the user belongs are used.

[Rule 4]: If a plurality of group access rights is set, the logical OR among them is used.

The basic structure of the second embodiment is the same as in the first embodiment. According to the second embodiment, however, in the access-rights determination processing shown in FIG. 6, (1) if user access rights can be acquired in step S004, the flow proceeds to step S008 instead of ending, and (2) if the processing shown in FIG. 6 is completed from step S010 or S012, the logical OR among the access-rights data of the user in question and all access-rights data acquired from all groups to which the user belongs is set as the access rights for the user.

THIRD EMBODIMENT

The basic structure of the third embodiment is the same as in the first embodiment. According to the third embodiment, however, the method for determining access rights differs if objects with the inheritance attribute set as "inherited" exist across a plurality of levels of the hierarchy and include access rights. According to the first embodiment, if access-rights data exist in a lower-level object of the hierarchy, it is given priority. According to this embodiment, the logical OR among the access-rights data at all levels of the hierarchy is calculated. More specifically, the following access-rights determination rules are used.

[Rule 1]: If access rights are set across a plurality of levels of the hierarchy, the logical OR among them is used.

[Rule 2]: The logical OR between user access rights and group access rights is used.

[Rule 3]: If no user access rights are set, access rights of the group to which the user belongs are used.

[Rule 4]: If a plurality of group access rights is set, the logical OR among them is used.

Processing according to the third embodiment may be achieved, for example, as follows in the access-rights determination processing shown in FIG. 6. That is, (1) access-rights data for the user is acquired based on all objects that "inherit" access rights through the processing in steps S003, S005, and S006 by skipping step S004; (2) access-rights data for all groups to which the user belongs are acquired from all objects that "inherit" access rights through the processing in steps S009, S011, and S012 by skipping step S010; and (3) the logical OR among all the acquired access-rights data is set as the access rights for the user.

FOURTH EMBODIMENT

Although, in the first embodiment, changing an inheritance attribute of a specified object causes the inheritance attribute of only the specified object to be changed, the present invention is not limited to this approach. If, for example, the inheritance attribute of an object is changed from "not inherited" to "inherited," the inheritance attributes of the specified object and all objects arranged below that object (objects whose parents are directly or indirectly the object in question) may be set to "inherited."

As described above, according to this embodiment, lower-level objects in the hierarchy may be given access-rights settings different from those of objects at higher levels, while still inheriting access-rights settings from data objects at different hierarchical levels. An access-rights determination based on a plurality of access-rights data assigned across a plurality of object hierarchical levels may be achieved. This preferred embodiment allows processing cost associated with access-rights settings to be reduced, while still enabling the user to perform flexible access-rights setting.

The present invention can also be achieved by providing the software program code for performing the functions of the foregoing embodiments (e.g., programs corresponding to the flowcharts described in the first embodiment) to a system or an apparatus directly or remotely, reading the program code with a computer of the system or apparatus from the storage medium, and then executing the program code.

In this case, the program code itself installed into the computer to execute the functions of the present invention on the computer constitutes the present invention. In short, the computer program for realizing the function processing according to the present invention is included in the present invention.

In this case, any form of program, including a program executed as object code or by an interpreter and script data supplied to an OS, is acceptable, as long as it functions as a program.

The storage medium for supplying the program code may include a Floppy® Disk, a hard disk, an optical disk, a magneto-optical disk, an MO, a CD-ROM, a CD-R, a CD-RW, a magnetic tape, a non-volatile memory card, a ROM, and a DVD (DVD-ROM and DVD-R).

Such a program may be supplied by accessing a home page on the Internet with a browser of a client computer and then downloading from the home page into a recording medium, such as a hard disk, the computer program according to the present invention or a compressed file of the program including an automatic installation function. Furthermore, the present invention can also be realized by dividing the program code constituting the program according to the present invention into a plurality of files, and downloading each of the files from different home pages. In other words, a WWW server for allowing a plurality of users to download program files for realizing functional processing according to the present invention into a computer is included in a claim of the present invention.

In addition, the present invention can also be realized by supplying a user with a recording medium, such as a CD-ROM, storing an encrypted version of the program according to the present invention, allowing only a user satisfying predetermined conditions to download key information for decrypting the encrypted program from a home page via the Internet, and executing the encrypted program with the key information to install the program into the computer.

As described above, the function of the above-described embodiment is achieved with the execution of the program code read by the computer. In addition, the function of the above-described embodiment may also be achieved by, for example, the OS running on the computer that performs all or part of the processing according to the commands of the program code.

Furthermore, the function of the above-described embodiment may also be achieved such that the program code read from a storage medium is written to a memory provided in an expansion card disposed in the computer or an expansion unit connected to the computer, and then, for example, the CPU provided on the expansion card or the expansion unit performs all or part of the processing based on commands in the program code.

Although the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-264593 filed Sep. 10, 2004, which is hereby incorporated by reference in its entirety.

What is claimed is:

1. An information processing apparatus for managing access rights to an object, comprising:

a memory configured to store objects that are hierarchically managed and access rights information associated respectively therewith, the access rights information for each object indicating access rights for one or more users, and the objects including a low-level object having an inheritance attribute indicating whether or not the low-level object inherits access rights from an object at a higher level, wherein the inheritance attribute is distinct from the access rights information and wherein the inheritance attribute has a first value when the low-level object can inherit access rights from an object at a higher level and has a second value when the low-level object cannot inherit access rights from an object at a higher level; and a processor, said processor configured to function as a determination unit to determine a user's access rights with respect to the low-level object, wherein (i) if the inheritance attribute of the low-level object has the second value, which indicates that inheritance cannot be performed, the determination unit determines the user's access rights with respect to the low-level object based on access rights information associated with the low-level object, and (ii) if the inheritance attribute of the low-level object has the first value, which indicates that inheritance can be performed, the determination unit determines the user's access rights with respect to the low-level object based on access rights information associated with the low-level object, if the access rights information associated with the low-level object includes access rights for the user, and determines the user's access rights based on access rights information associated with a higher-level object that includes access rights information regarding the user, if the access rights information associated with the low-level object does not include access rights for the user, wherein the low-level object can have access rights information concerning one or more users and can inherit access rights information concerning other users.

2. The information processing apparatus according to claim 1, wherein, if the inheritance attribute of the low-level object has the first value, the determination unit determines the access rights to the low-level object for the user based on a logical OR between access rights information regarding the user set for the low-level object and access rights information regarding the user set for at least one object at a higher level.

3. The information processing apparatus according to claim 1, wherein the access rights information is set for an object based on at least one of a user and a group including a plurality of users.

4. The information processing apparatus according to claim 3, wherein the determination unit determines the user's access rights with respect to the low-level object by giving priority to access rights set for the user over access rights set for a group to which the user belongs.

5. The information processing apparatus according to claim 3, wherein the determination unit determines the user's access rights with respect to the low-level object to be access rights with respect to the low-level object set for a group to which the user belongs, when no access rights information regarding the user is set for the low-level object.

6. The information processing apparatus according to claim 5, wherein the determination unit determines the user's access rights with respect to the low-level object to be the logical OR between a plurality of access rights set for a plurality of groups to which the user belongs.

7. The information processing apparatus according to claim 1 further comprising:
a processing unit configured to change the value of the inheritance attribute of the low-level object.

8. The information processing apparatus according to claim 7, wherein, if the processing unit changes the value of the inheritance attribute of the low-level object to the first value, the processing unit changes the inheritance attribute of objects below the low-level object to indicate that inheritance is performed.

9. The information processing apparatus according to claim 7, wherein the processing unit is configured to set access rights information for the low-level object according to a change in the value of the inheritance attribute.

10. The information processing apparatus according to claim 9, wherein, if the processing unit changes the value of the inheritance attribute of the low-level object to the second value, the processing unit sets the access rights information for the low-level object to the access rights information for the lowest-level object among the low-level object and the objects at a level higher than the low-level object, and, if the processing unit changes the value of the inheritance attribute to the first value, the processing unit sets the access rights information for the low-level object to no setting if one of the objects at a level higher than the low-level object includes access rights information.

11. An information processing method for managing access rights to an object, comprising the steps of:
storing into a storage unit objects that are hierarchically managed and access rights information associated respectively therewith, the access rights information for each object indicating access rights for one or more users, and the objects including a low-level object having an inheritance attribute indicating whether or not the low-level object inherits access rights from an object at a higher level, wherein the inheritance attribute is distinct from the access rights information and wherein the inheritance attribute has a first value when the low-level object can inherit access rights from an object at a higher level and has a second value when the low-level object cannot inherit access rights from an object at a higher level; and
determining a user's access rights with respect to the low-level object,
wherein (i) if the inheritance attribute of the low-level object has the second value, which indicates that inheritance cannot be performed, the determining step determines the user's access rights with respect to the low-level object based on access rights information associated with the low-level object, and (ii) if the inheritance attribute of the low-level object has the first value, which indicates that inheritance can be performed, the determining step determines the user's access rights with respect to the low-level object based on access rights information associated with the low-level object, if the access rights information associated with the low-level object includes access rights for the user, and determines the user's access rights based on access rights information associated with a higher-level object that includes access rights information regarding the user, if the access rights information associated with the low-level object does not include access rights for the user,
wherein the low-level object can have access rights information concerning one or more users and can inherit access rights information concerning other users.

12. The information processing method according to claim 11, wherein, if the inheritance attribute of the low-level object has the first value, determining the user's access rights with respect to the low-level object is based on a logical OR between access rights information regarding the user set for the low-level object and access rights information regarding the user set for the at least one object at a higher level.

13. The information processing method according to claim 11, wherein the access rights information is set for an object based on at least one of a user and a group including a plurality of users.

14. The information processing method according to claim 13, wherein determining the user's access rights with respect to the low-level object gives priority to access rights set for the user over access rights set for a group to which the user belongs.

15. A computer-readable storage medium storing a computer-executable program for causing a computer to execute an information processing method for managing access rights to an object, the method comprising the steps of:
storing into a storage unit objects that are hierarchically managed and access rights information associated respectively therewith, the access rights information for each object indicating access rights for one or more users, and the objects including a low-level object having an inheritance attribute indicating whether or not the low-level object inherits access rights from an object at a higher level, wherein the inheritance attribute is distinct from the access rights information and wherein the inheritance attribute has a first value when the low-level object can inherit access rights from an object at a higher level and has a second value when the low-level object cannot inherit access rights from an object at a higher level; and
determining a user's access rights with respect to the low-level object,
wherein (i) if the inheritance attribute of the low-level object has the second value, which indicates that inheritance cannot be performed, the determining step determines the user's access rights with respect to the low-level object based on access rights information associated with the low-level object, and (ii) if the inheritance attribute of the low-level object has the first value, which indicates that inheritance can be performed, the determining step determines the user's access rights with respect to the low-level object based on access rights information associated with the low-level object, if the access rights information associated with the low-level object includes access rights for the user, and determines the user's rights based on access rights information associated with a higher-level object that includes access rights information regarding the user, if the access rights information associated with the low-level object does not include access rights for the user, wherein the low-level object can have access rights information concerning one or more users and can inherit access rights information concerning other users.

16. The computer-readable storage medium storing the computer-executable program according to claim 15, wherein, if the inheritance attribute of the low-level object has the first value, determining the user's access rights with respect to the low-level object is based on a logical OR between access rights information regarding the user set for the low-level object and access rights information regarding the user, set for the at least one object at a higher level.

17. The computer-readable storage medium storing the computer-executable program according to claim 15, wherein the access rights information is set for an object based on at least one of a user and a group including a plurality of users.

18. The computer-readable storage medium storing the computer-executable program according to claim 17, wherein determining the user's access rights with respect to the low-level object gives priority to access rights set for the user over access rights set for a group to which the user belongs.

* * * * *